United States Patent [19]

Tidquist

[11] 4,278,478
[45] Jul. 14, 1981

[54] METHOD OF STACK CUTTING

[76] Inventor: Quinton Tidquist, 2200 Magnolia, Denver, Colo. 80207

[21] Appl. No.: 13,549

[22] Filed: Feb. 21, 1979

[51] Int. Cl.³ .............................................. B23K 7/00
[52] U.S. Cl. ..................................................... 148/9 R
[58] Field of Search ............... 148/9 C, 9 R; 228/190, 228/178; 29/609, 596

[56] References Cited

U.S. PATENT DOCUMENTS

| | | | |
|---|---|---|---|
| 3,068,564 | 12/1962 | Wiedt, Jr. ......................... | 228/190 X |
| 3,092,897 | 6/1963 | Agner .............................. | 228/190 X |
| 3,119,724 | 1/1964 | Campbell ............................ | 148/9 R |
| 3,338,757 | 8/1967 | Dodge et al. ....................... | 148/9 R |
| 3,457,635 | 7/1969 | Michiulis ............................ | 29/609 |
| 3,620,521 | 11/1971 | Lundberg ........................... | 148/9 R |
| 3,633,896 | 1/1972 | Muto et al. ......................... | 148/9 R |

*Primary Examiner*—M. J. Andrews
*Attorney, Agent, or Firm*—Richard D. Law

[57] ABSTRACT

A stack of edge aligned, thin metal sheets pressed into tight face-to-face engagement between rigid upper and lower plates, and a series of closely spaced peripheral welds from upper to lower plates secures the stack together for torch cutting predetermined patterns from the stack without warping and excessively burning the thin sheets.

6 Claims, 6 Drawing Figures

METHOD OF STACK CUTTING

This invention relates to a method of preparing a stack of thin metal sheets for torch cutting the sheets into predetermined exact shapes, called stack cutting.

Where it is desired to cut a number of shapes from sheet metal, as for example, for manufacturing purposes, one method is to similtaneously cut a number of the same shapes from a stack of the blank sheets. One method of producing the desired configuration is to move a flame jet along a predetermined path by means of a shape cutting apparatus, sometimes called a pantograph. For relatively thick metal, torch cutting does not warp the finished shape, but for sheet metal of 20 to 8 gauge, warping is a substantial problem in the torch cutting. It has been proposed in the art to hydraulically apply pressure on stack of thin metal sheets, and to torch cut the stack in the vicinity of the pressure points. When the sheets are large, they must be progressively moved in the vicinity of the moving torch jet and the hydraulic press assembly since the equipment is large and bulky. However, because of the very large equipment necessary, pressure can not be effectively applied to the total area or even large areas on the sheets, some sheets may be for example, 5 feet by 20 feet. Usually the desired shape is substantially of a smaller area than the whole sheet, so that many shapes may be cut from a single sheet. This, also, produces problems, as the sheets are released from pressure the movement of the stack of sheets tends to release the face-to-face pressure between the sheets letting air flow between the sheets. When air gets between the sheets, it forms spaces or inerstices and the flame of the cutting torch can expand and damage the desired shapes or the flame loses its cutting ability.

Thus, it has been found that it is essential to maintain the sheets in very close contact to prevent warping and bulking, and the loss of cutting flame, particularly in thinner sizes of sheet metal. The table edge clamps of the prior art have not been completely satisfactory due to the lack of complete area clamping of the stack of thin metal sheets. Further, clamping at only the cutting area may require moving the clamps to new locations during the cutting, particularly where the desired shape is relatively large. Such clamping, also, requires large equipment which may only infrequently be used, and small shops are precluded from its use.

OBJECTS AND ADVANTAGES OF THE INVENTION

It is an object and advantage of the invention to provide a method of cutting a stack of thin metal sheets with a cutting torch into desired identical shapes.

Another object of the invention is to provide a method of forming as a self-sustaining block a stack of thin metal sheets in very close face-to-face engagement with minimum of spaces and interstices for torch cutting the stack into a plurality of desired shapes.

A further object of the invention is to prepare a stack of a plurality of thin metal sheets of substantial area for torch cutting into a plurality of predetermined shapes without large mechanism to press the sheets together during the actual cutting, and provide such stacks.

These and other objects of the invention may be ascertained by reference to the following description and appended illustrations.

GENERAL DESCRIPTION OF THE DRAWINGS

DETAILED DESCRIPTION OF THE DRAWINGS

A major feature of the invention is to secure a stack of a plurality of edge aligned thin metal sheets between upper and lower cover plates, and edge welding the stack to produce a rigid coherent stack. The welding technique is to edge tack together the sheets and cover plates by a series of closely spaced weldments which extend from the top plate to the bottom plate. The weldments maintain the sheets in a coherent stack in very close face-to-face engagement during torch cutting operations without pressure equipment to hold the stack.

Figure 1:
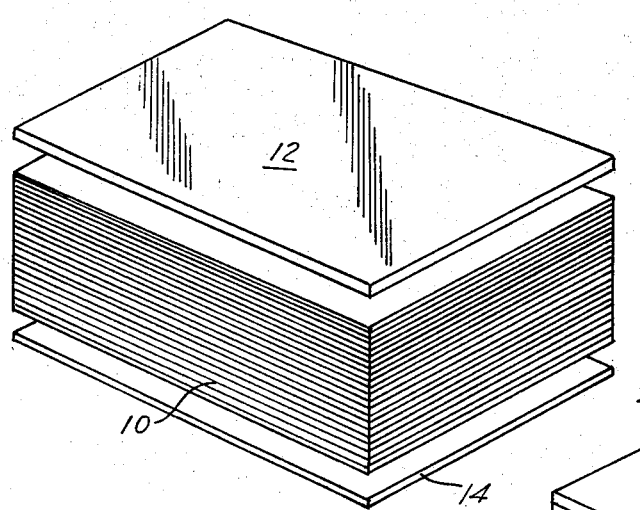
FIG. 1 is a perspective, exploded view of a plurality of thin metal sheets positioned with top and bottom cover plates ready for forming in a stack.

In the modification shown in FIG. 1, a plurality of thin metal sheets 10 (usually steel sheets) are arranged in an edge aligned stack between top plate 12 and bottom plate 14, both steel plates. The thin metal sheets are the same area dimensions as the covering plates so that all their edges are in alignment and coincide in planes along each of the four sides of rectangular sheets and plates. Up to about 50 number 16 guage metal sheets may be stacked between a ¼ inch top plate and a ¼ inch bottom plate. The depth of the stack is, obviously, a function of the length and temperature of the flame jet to be used in cutting through the stack. Thus, for different thickness of metal sheet, maximum number of sheets may vary. Sheets from considerably less than about 3/16 inch to less than 1/16 inch may be stacked and cut with a flame jet, oxy-fuel torch, or the like. The sheets and plates should be clean with no foreign matter which would prevent close face-to-face engagement of the neighboring sheets. The cover sheets may be in excess of 3/16 of an inch, and preferably about ¼ inch thick.

Figure 2:
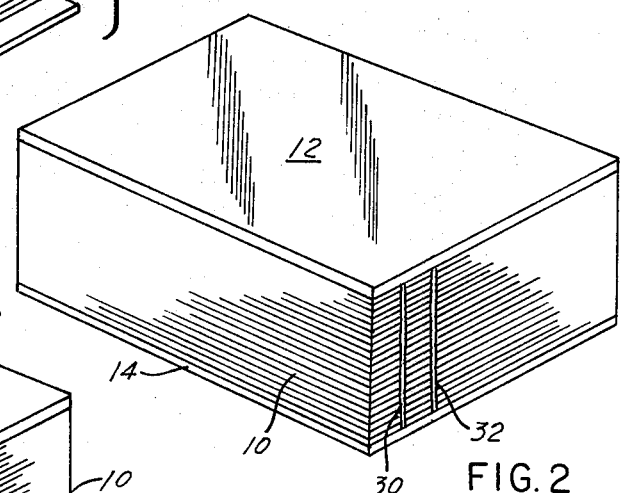
FIG. 2 is a perspective, generally schematic, of one method of holding a stack of thin metal sheets perparatory to securing the stack together.
Figure 3:
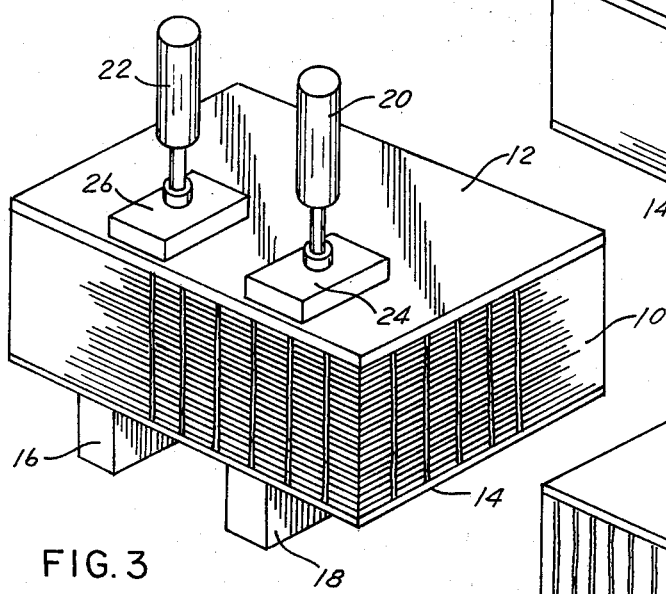
FIG. 3 is a perspective, generally schematic, of the starting welds of a securing method of the invention.
Figure 4:
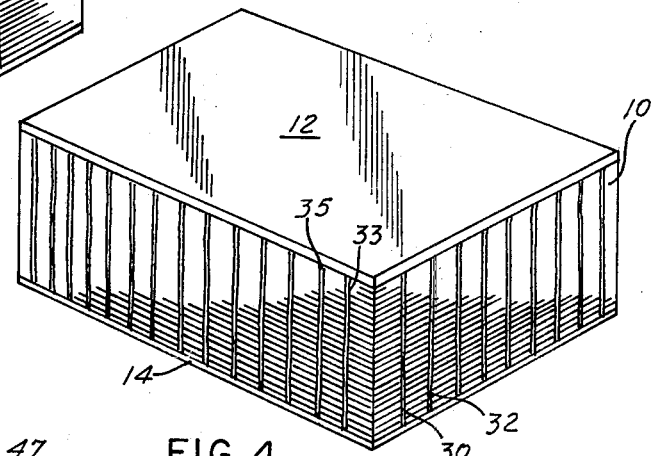
FIG. 4 is a perspective view of a coherent stack of thin metal sheets in secured stacked position.
Figure 5:
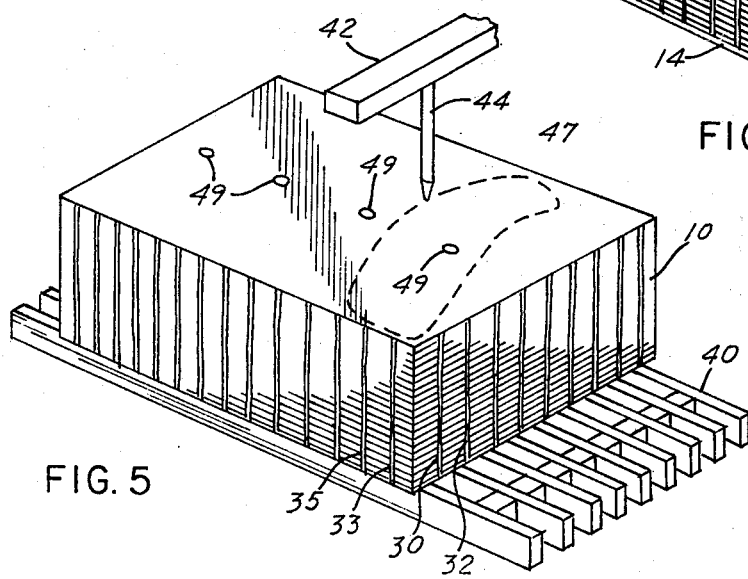
FIG. 5 is a detail of a portion of a secured stack of thin metal sheets showing the weldments holding the sheets in a stack.

In preparation for securing the sheets and plates into essentially a solid coherent stack, the clean sheets and plates are aligned with their edges forming planes. The sheets and plates should have edges which may be readily aligned. When formed in the stack, the stack is pressed to engage the sheets and plates in very close face-to-face engagement, particularly along the edges. One method of pressing the stack is shown in FIG. 2, where an aligned stack of sheets are covered by the plates 12 and 14, and the stack is positioned on a supporting frame, for example heavy bars 16 and 18. This frame must be rigid so as not to bend or warp under pressure. The stack is pressed along the edges, as by hydraulic rams 20 and 22, on support frames 24 and 26. The number of rams necessary is determined by the top surface area of stack and length of the edges around the stack. Other methods of pressing the sheets and plates into a tight stack may be used for example mechanical clamps, as C-clamps, etc. In the edge pressed condition, a series of weldments is run in vertical lines, i.e. in perpendicular lines, on the edges of the stack in the plane of the top and bottom sheets. These weldments are preferably produced by arc welding so as to secure all the sheets and the two cover plates to welding metal. In FIG. 3, the start of the welding procedure is shown, including a weldment 30 adjacent the corner and a weldment 32 spaced from the first weldment. The weldments are generally uniformly spaced around the periphery of the stack, FIGS. 4 and 5, where weldments 33 and 35 are shown on the long side of the stack. The distance between the weldments may be from 1 to 4 inches and preferably about 2 inches. The weldments extend from cover plate to cover plate and is accomplished to insure the welding of the edges of the sheets together, and that the edge of each plate is secured to the weldment. The completed coherent stack may be moved around without disrupting the very close face-to-face relation of the plates and sheets. Further, the stack may be easily moved to the torch cutting area without disrupting the stack, and the desired shapes cut in the stack, following a template or the like for guiding the cutting torch without additional pressing the stack during the cutting.

Figure 6:
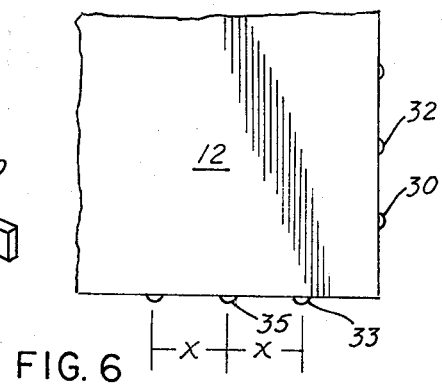
FIG. 6 is schematic perspective of one method of torch cutting predetermined shapes of thin metal sheets from a coherent stack according to the invention.

The stack may be placed on a bench 40, of a cutting assembly for example, FIG. 6, and where necessary the stack may be secured in place on the bench by stops, clamps or the like. A frame 42 (only partially shown) supports a cutting torch nozzle 44 at the desired height above the top plate 12. The cutting torch is moved around above the surface of plate 12, following the design of a template, for example, to cut out from the stack of sheets an exact configuration of the template, for example, the shape 47 of FIG. 6. A number of other shapes, or repeats of same shape may be cut from the remainder (after the first cutting) of the stack. Also, the shape of the cut may be painted or inked on the top plate and the torch moved to follow the design. When the size of the plates is quite large, it may be advantageous to apply a pressure in or near the desired shape to be cut out. A separate clamp or hydraulic press may be used in the area of the desired shape or near it. A simple method includes boring holes 49 in or near (for example on both sides of the shape) and placing a bolt and nut assembly in the hole. This holds the plate together, when tighted, for the cutting.

When the stack is held tightly without admitting air between the sheets, the cut shapes are very accurate as to size and shape and they are not welded together but the sheets have clearly cut edges. This reduces labor to clean up the edges for subsequent mounting the shapes in an assembly.

During the cutting, the stack does not require pressing under heavy loads to prevent buckling, warping or other distortion of the sheets. The desired shapes may, therefore, be cleanly cut from each of the sheets in the stack very accurately. The stack may be moved along the bench to subject an uncut area to the cutting operation, particularly where the cutting torch assembly is relatively fixed. Some cutting assemblies are relatively fixed, or located within a limited area, so they may not be readily moved over entire stack. The method of the invention permits forming a coherent stack of thin metal sheets and cutting the stack of thin metal sheets without heavy, bulky and unwieldy pressure applying equipment.

What is claimed is:

1. A method of forming a stack of thin metal sheets ready for torch cutting into a stack of individual and separate shapes without warping comprising:
    (a) forming a stack of clean, thin rectilinear metal sheets of the same size and shape, one above the other,
    (b) placing a cover plate on the top and bottom of said stack of thin metal sheets, said cover plates being substantially thicker than said sheets and essentially resistant to warping under torch cutting, and the edges of said sheets and plates being in general alignment,
    (c) pressing said stack of thin metal sheets and cover plates in very close face-to-face engagement without bonding the sheets together and excluding air from between the sheets
    (d) welding said sheets and plates together by a series of narrow perpendicular weldments along the edges of the stack, each weldment extending from cover plate to cover plate and welded to all said sheets, said weldments being closely spaced and extending around the periphery of the stack to hold said plates in close face-to-face non-bonding engagement so that said stack may be torch cut inside the edges of the stack to produce a stack of non-bonded, individual shapes free from each other and
    (e) torch cutting shapes from said stack interiorly of said weldments.

2. A method according to claim 1, wherein said thin metal sheets have a thickness range of from about 20 to about 8 guage sheet metal.

3. A method according to claim 1, wherein said cover sheets are at least about 3/16 inches thick.

4. A method according to claim 3, wherein said top cover plate is about ¼ inches thick steel plate and said bottom cover plate is about ¼ inch thick steel plate.

5. A method according to claim 1, wherein said weldments are spaced uniformly on the edge of the sheets around the periphery of the stack.

6. A method according to claim 5, wherein said weldments are spaced at from 1 to 4 inches apart.

* * * * *